Patented Aug. 9, 1949

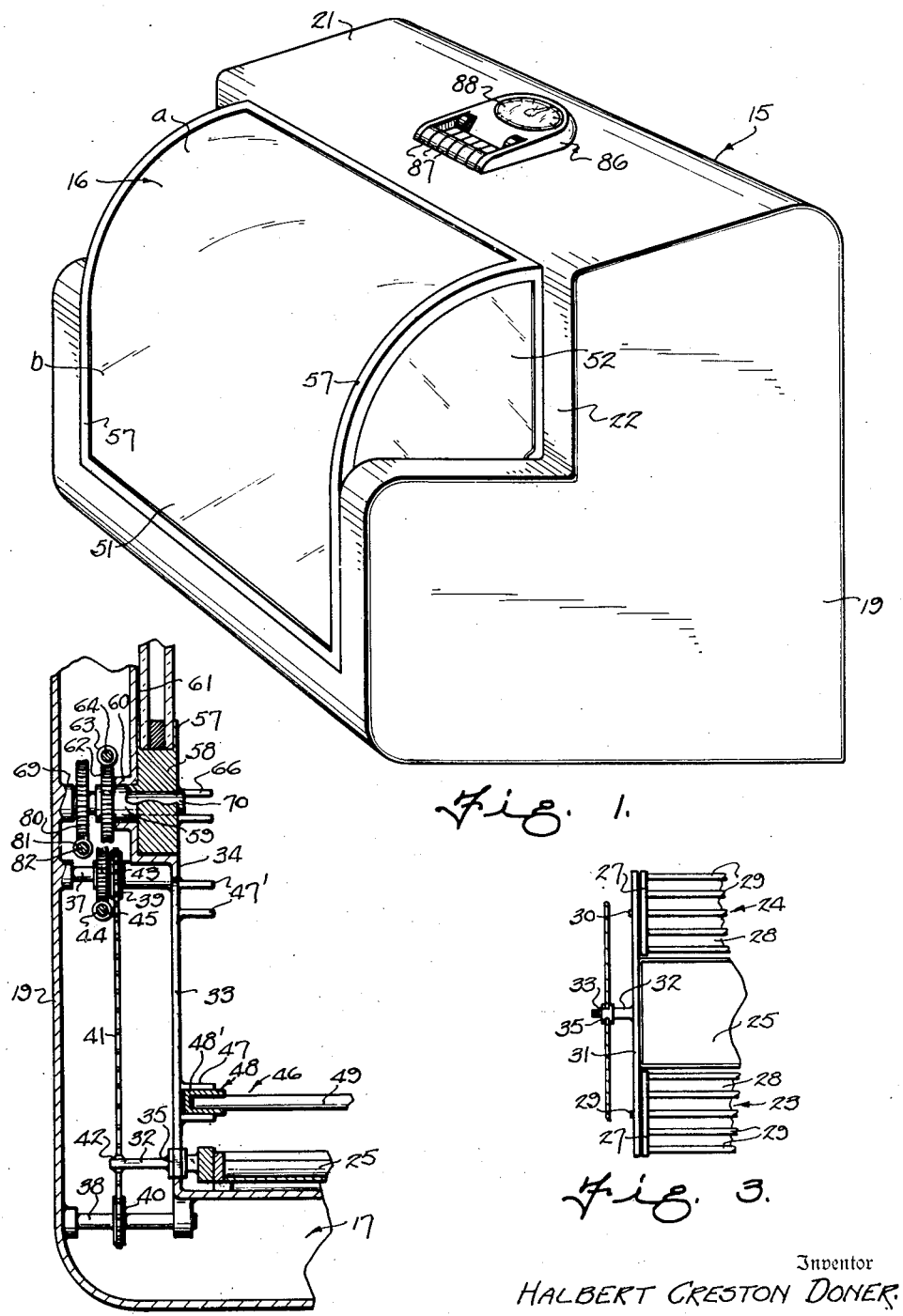

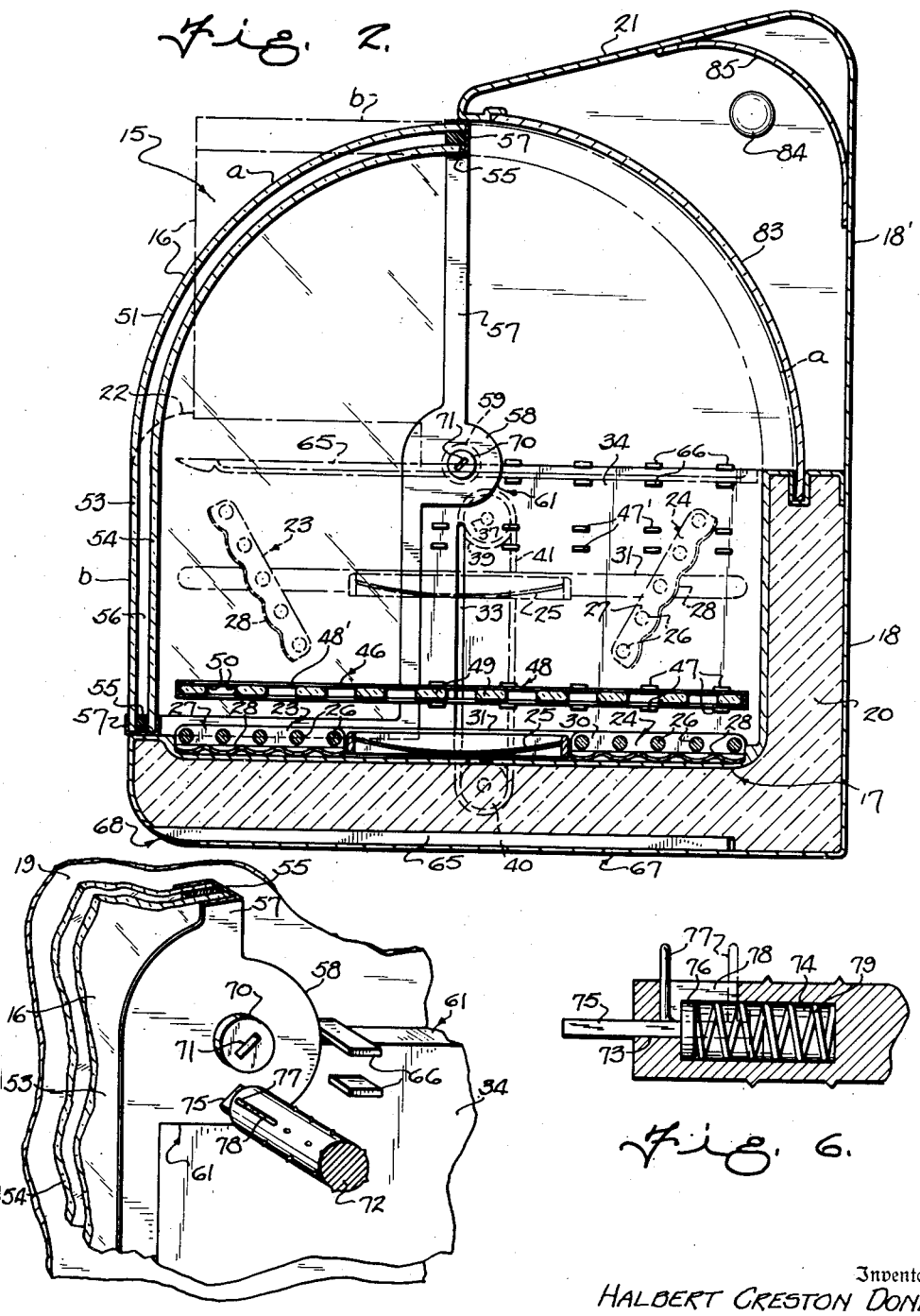

2,478,253

UNITED STATES PATENT OFFICE 2,478,253

COMBINATION OVEN UNIT

Halbert Creston Doner, Toledo, Ohio, assignor to Libbey-Owens-Ford Glass Company, Toledo, Ohio, a corporation of Ohio Application December 2, 1942, Serial No. 467,605

1 Claim. (Cl. 219—35)

The present invention relates to a new type of oven particularly adapted for but not restricted to domestic use.

An object of the invention is the provision of a combination oven which, in addition to carrying out the customary baking operations, is also adaptable for various other cooking processes.

Another object of the invention is the provision of a combination oven which may not only be used for baking but which may be easily and quickly converted for use as a barbecue or for the broiling and frying of foods.

Another object of the invention is the provision of a combination oven which may be suitably mounted upon a wall and located at a height most comfortable for the housewife, whereby to eliminate all necessity for stooping or other tiring efforts during the cooking operations.

A further object of the invention is the provision of a combination oven provided with a transparent closure through which the cooking operations may be viewed at all times and also wherein the transparent closure when in open position serves as a hood for protecting the housewife from spattering oils and greases.

A further object of the invention is the provision of a combination oven provided with electrical heating elements which are vertically and angularly adjustable to accommodate them to the particular type of baking or other cooking operation being carried out and which are provided with means for directing the heat rays in a manner to obtain the most efficient heating in each case.

A still further object of the invention is the provision of operating means for opening and closing the transparent closure, for adjusting the heating units vertically, and for revolving the spit when the oven is used as a barbecue.

Other objects and advantages of the invention will become more apparent during the course of the following description, when taken in connection with the accompanying drawings.

In the drawings, wherein like numerals are employed to designate like parts throughout the same:

Fig. 1 is a perspective view of a combination oven constructed in accordance with the invention;

Fig. 2 is a transverse section therethrough;

Fig. 3 is a plan view of a portion of the heating units;

Fig. 4 is a vertical transverse section through one end of the oven showing the means for actuating the transparent closure, for adjusting the heating units vertically, and for revolving the barbecue spit;

Fig. 5 is a detail perspective view showing how the barbecue spit is mounted; and Fig. 6 is a detail section through the spit taken substantially on line 6—6 of Fig. 5.

With reference now to the drawings, the oven includes generally a housing designated in its entirety by the numeral 15 and provided with a transparent front closure 16. The housing 15 comprises a bottom wall 17, back wall 18 and opposite end walls 19, these walls being hollow and filled with a suitable insulating material 20. The rear face of the hollow back wall 18 extends upwardly as at 18' and merges into a forwardly and downwardly inclined top 21 which terminates at substantially the vertical transverse center of the housing 15 leaving the front of the housing open for the reception of the transparent closure 16. The opposite end walls 19 are also notched or cut away as at 22 so that the transparent closure extends thereabove.

Supported upon the bottom wall 17 of the housing are two spaced parallel heating units 23 and 24 between which is arranged a drip pan 25. Each heating unit consists of a plurality of electrical heating elements 26 secured at each end to a transverse plate 27, which plates also carry a removable reflector 28. The heating units 23 and 24 are provided at each end thereof with trunnions 29 and 30 rotatable in a supporting bar 31 to which the drip pan 25 is also secured. Each supporting bar 31 is provided intermediate its ends with a horizontal arm 32 passing through a slot 33 in the inner wall 34 of one of the end walls 19 and grooved as at 35 to receive the side walls of the slot therein and form a guide means for the heating units.

Mounted within each end wall 19 are upper and lower horizontal shafts 37 and 38 to which are keyed sprockets 39 and 40 about which is trained a chain 41 secured to the outer end of the respective arm 32 as indicated at 42. Also keyed to the upper shaft 37 is a worm gear 43 with which meshes a worm 44 keyed to a shaft 45 driven from a suitable motor (not shown) but which may be mounted within the wall of the housing. Upon turning of the shafts 37 and 38 in the desired direction, the heating elements 23 and 24 and drip pan 25 can be raised or lowered as a unit. The heating units may also be turned upon the trunnions 29 and 30 to any desired angle as indicated in broken lines in Fig. 2.

For the usual baking operations, the heating units 23 and 24 are disposed in horizontal position as shown in full lines in Fig. 2, at which time they rest upon the inner wall of the bottom 17. The foods to be baked are placed upon a rack 46 adapted to be slid between and supported by pairs of ears 47 extending outwardly from the inner wall 34. The rack 46 comprises a rectangular frame 48 made up of four metal channel members, the side members 48' of which are adapted to receive the ends of a plurality of spaced, tempered glass strips 49 extending therebetween. The side members 48' may be crimped or provided with projections as at 50 to maintain the glass strips in position and the strips themselves are preferably given a pencil polish on their longitudinal edges to eliminate sharp corners. It will be noted that additional ears or guides 47' may be formed on the inner wall 34 to permit the removable rack 46 to be used at different heights in the oven.

The transparent closure 16 consists of a curved front panel 51 and flat end panels 52 disposed at right angles to said front panel. Each panel is in the form of a double glazed unit comprising two sheets of glass 53 and 54 maintained spaced from one another by suitable spacer means 55 to provide an insulating space 56 therebetween. The double glazing units are mounted in a metal frame 57 extending around all edges of the units. At substantially the vertical and transverse center of the housing, the metal frame for each end panel is provided with a boss 58 having formed integral therewith an outwardly extending horizontal sleeve 59 rotatably mounted in a bearing 60 in the respective end wall (Fig. 4). The inner walls 34 of the end walls 19 are recessed as at 61 to receive the end panels 52 together with their metal frame and boss 58 so that the inner face of these panels will be flush with the walls 34 in both open and closed positions.

With this construction, it will be seen that when the closure is rocked upon the sleeves 59 it can be moved from open to closed position and vice versa. In other words, the sleeves 59 constitute the axis about which the closure rocks. The closure is shown closed in full lines in Fig. 2 and in open position by the broken lines. The opening and closing of the closure is also mechanically effected and to this end there is keyed to each of the sleeves 59 a worm gear 62, with which meshes a worm 63 keyed to a shaft 64 driven from a suitable motor (not shown).

As pointed out above, the oven herein provided is adapted not only for the usual baking operations but may also be used in other cooking processes. For example, it may be employed in the frying of foods and, in such case, a pan 65 is adapted to be supported approximately in the center of the oven as shown in Fig. 2. For this purpose, the rack 46 is removed and the heating units raised to the desired height as described above. The pan 65 can be supported upon stationary tracks 66 formed, for example, by ears secured to or struck out from the opposite end walls of the housing. When the pan is not in use it may be placed in a recess 67 in the bottom of the housing, said bottom being provided with an opening 68 in the front thereof to permit insertion of the pan in said recess.

In accordance with the invention, the oven can also be easily and quickly converted into a barbecue having a revolving spit. To this end, there is rotatably mounted within each boss 58, sleeve 59, and also within a bearing 69 in each end wall a stub shaft 70 having a rectangular slot 71 in its inner end as shown in Fig. 5. The rotary spit is designated by the numeral 72 and is provided at each end thereof with a rectangular slot 73 leading to an annular recess 74. Inserted through the slot 73 is a plate 75 having secured to its inner end a disk 76 received in recess 74. The plate 75 is also provided with a handle 77 which projects through a slot 78 in the wall of the recess 74. Arranged within the recess 74 is a compression spring 79 for normally urging the plate 75 outwardly. When it is desired to mount the spit, it is simply necessary to force the plates 75 inwardly by means of the handles 77 and to align them with the slots 71 in the stub shafts 70, after which the handles are released, whereupon the springs will then force the plates outwardly into said slots. It is also preferred that means be provided for rotating the spit and for this purpose there may be keyed to each of the stub shafts 70 a worm gear 80 which meshes with a worm 81 keyed to shaft 82 driven by a suitable motor (not shown).

When food is being barbecued, the heating elements 23 and 24 will be raised and turned upon their trunnions 29 and 30 to bring them into the position shown in broken lines in Fig. 2. It will be noted that, because the reflectors 28 are carried by the plates 27, the heat rays from the heating units 23 and 24 will always be reflected directly toward the food being cooked regardless of whether the heating units are in a horizontal position, as for baking or frying, or in an angled position for barbecuing. When it is desired to broil foods, the pan 65 may be placed on the rack 46. At this time, the heating elements 23 and 24 should be at the height indicated by broken lines in Fig. 2, but should be turned completely over upon their trunnions 29 and 30 so that the units will be in a horizontal position with the reflector 28 on top. In this way, the heat rays will be directed downwardly upon the food in the pan 65.

Arranged inwardly of the upper portion 18' of the back wall of the housing 15 is a curved plate 83 of tempered glass, such as, for example, Vitrolux, which serves as a translucent lighting panel to illuminate the entire interior of the oven. Arranged in back of the panel is a fluorescent lamp or the like 84, with the light thereof being directed upon the panel 83 by a reflector plate 85.

Due to the provision of the transparent closure, it will be evident that the foods being prepared will be visible at all times. The front panel comprises an arcuately curved upper portion $a$ and a substantially flat lower portion $b$. When the closure is opened, the upper curved portion thereof slides rearwardly and is disposed inwardly of the curved glass panel 83, while the lower flat portion is horizontally disposed and projects forwardly of the top wall 21 as shown in broken lines in Fig. 2 to provide a hood for protecting the housewife from flying or spattering oils and greases. In other words, the housewife can inspect the foods by looking downwardly through the transparent hood without exposing herself directly to the interior of the oven.

The electric heating elements 26 can be regulated by any suitable controls such as are presently employed on electric stoves, and it is not thought necessary that the various types of control be referred to in detail. As shown in Fig. 1, an instrument panel 86 is preferably mounted in the top 21 of the housing 15. The panel includes push button type switches 87 for controlling the heating elements and also for causing vertical movement thereof and for opening and closing the transparent closure 16. An electrical clock 88 is also provided and may be connected in series with the switches 87 in a manner to render the operation of the oven automatic.

It is to be understood that the form of the invention herewith shown and described is to be taken as a preferred embodiment of the same, and that various changes in the shape, size and arrangement of parts may be resorted to without departing from the spirit of the invention or the scope of the subjoined claim.

I claim:

An oven of the character described comprising, a housing having a working opening therein and a movable closure for said opening, a heating unit comprising a plurality of heating elements within said housing, means whereby food to be cooked can be supported at a plurality of positions within the housing including means for removably supporting a revolving spit at one position in said housing, and means for mounting said heating unit for pivotal angular tilting adjustment and bodily movement as a unit at right angles to the axis of tilting adjustment toward and away from any of said cooking positions.

HALBERT CRESTON DONER.

REFERENCES CITED

The following references are of record in the file of this patent:

UNITED STATES PATENTS

| Number | Name | Date |
|---|---|---|
| 529,148 | Whitman | Nov. 13, 1894 |
| 1,765,247 | Seegmuller | June 17, 1930 |
| 1,963,089 | Henderson | June 19, 1934 |
| 2,198,436 | Hoffman | Apr. 23, 1940 |
| 2,234,596 | Heilman | Mar. 11, 1941 |
| 2,245,220 | Nelson | June 10, 1941 |
| 2,340,354 | Wells | Feb. 1, 1944 |

FOREIGN PATENTS

| Number | Country | Date |
|---|---|---|
| 451,702 | Great Britain | Aug. 11, 1936 |